United States Patent [19]  [11] 4,368,932
Wolzenburg  [45] Jan. 18, 1983

[54] SHEET-METAL RING MOUNT FOR ANTI-FRICTION BEARING

[75] Inventor: Heinrich Wolzenburg, Dortmund, Fed. Rep. of Germany

[73] Assignee: Estel Hoesch Werke Aktiengesellschaft, Dortmund, Fed. Rep. of Germany

[21] Appl. No.: 256,488

[22] Filed: Apr. 22, 1981

[51] Int. Cl.³ .............................................. F16C 33/58
[52] U.S. Cl. .................................... 308/227; 308/231; 308/235
[58] Field of Search ............... 308/227, 231, 235, 234, 308/222, 223

[56] References Cited

U.S. PATENT DOCUMENTS

| 2,734,786 | 2/1956 | McNicoll | 308/235 |
| 3,129,986 | 4/1964 | Strassberg | 308/222 |
| 4,045,100 | 8/1977 | Beauchet | 308/234 |
| 4,120,543 | 10/1978 | Greene | 308/235 |

Primary Examiner—Lenard A. Footland
Attorney, Agent, or Firm—Max Fogiel

[57] ABSTRACT

Sheet-metal ring mount for anti-friction roller bearings has an inner and an outer race ring each composed of two sheet metal annuli both of which have a flange portion and a race portion. The race portions of two annuli together bound two sides of the four sides of the race in which a series of anti-friction rollers is received for rotation in such a manner that the axis of rotation of successive rollers extend at right angles to one another.

4 Claims, 1 Drawing Figure

U.S. Patent  Jan. 18, 1983  4,368,932
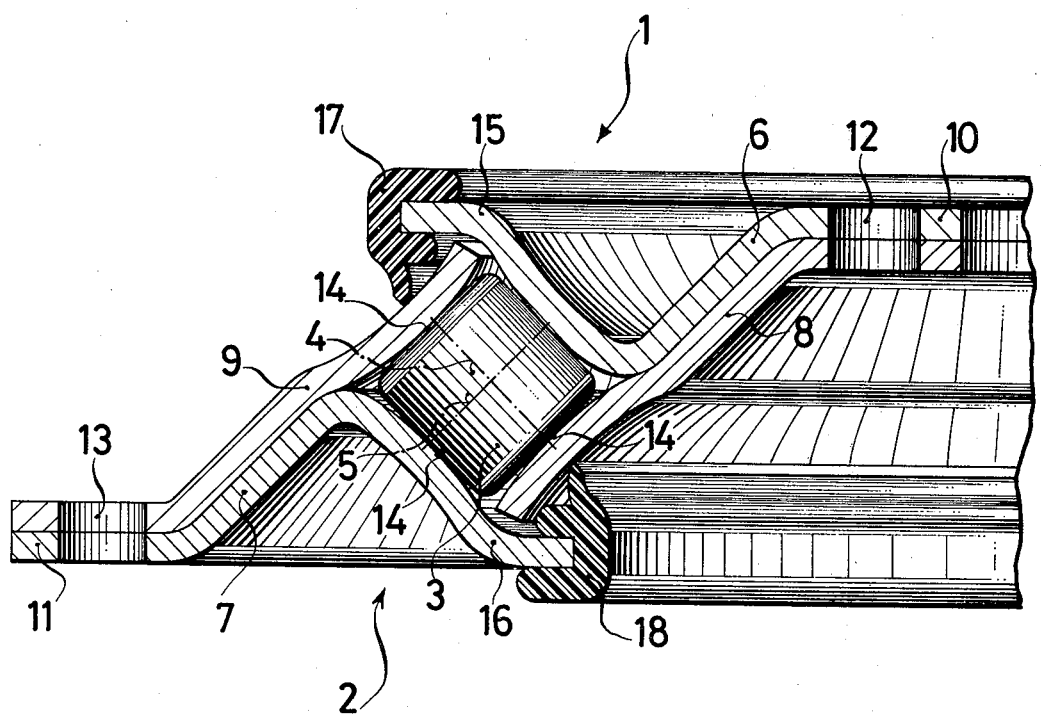

SHEET-METAL RING MOUNT FOR ANTI-FRICTION BEARING

BACKGROUND OF THE INVENTION

The present invention relates to a ring mount for anti-friction bearings in general, and more particularly to a sheet-metal ring mount for anti-friction bearings, particularly for mounting easily turnable structures on supports which are not, or not entirely, resistant to twisting, distortion and the like.

This type of ring mount is, for example, currently being used for mounting light-weight turnable weapons (e.g. machine guns) on light-weight vehicles (e.g. jeeps) and in order to save weight it is known to make the inner and outer rings of these mounts of aluminum. It has also been proposed to use sheet-metal mounts for an axial roller system, namely in German Published Application No. 2,540,793, and for a ball bearing system according to German Gebrauchsmuster No. 1,945,404.

According to another proposal it has also been suggested to make relatively large-size sheet metal ring mounts for use with vehicles of all types. In this proposal a one-row axial ball bearing system is employed and it has also been suggested that rollers might be used instead of the bearing balls. As in the German Allowed Application No. 2,540,793, this proposal is directed to an axial single-row system of anti-friction bearing bodies.

The problem with these prior-art proposals is that they are not usable in the context with which the present invention is concerned. Ball bearings, when used in conjunction with supports which are not completely resistant to twisting and other types of deformation and when used in conjunction with races formed by mounts which themselves are not completely resistant to twisting or other deformation, tend to develop anti-rotation resistance peaks in an irregular (and hence unpredictable) pattern which results from tumbling of the axis of rotation of the bearing balls. Axial roller bearings, on the other hand, are not suitable for transmitting radial and lifting forces. For this reason, it is known to use—in connection with supports which are not free of twisting or other deformation—a so-called cross-roller system as disclosed for example in German Gebrauchmuster No. 1,960,135, but there in the context of massive non-deformable bearing rings.

SUMMARY OF THE INVENTION

It is an object of the present invention to overcome the disadvantages of the prior art.

A more particular object of the invention is to provide a sheet-metal ring mount which is capable of operating with a cross-roller system of the type mentioned above and can reliably transmit differently directed forces even in the event of some deformation and impacts.

A concomitant object is to provide a sheet-metal ring mount of the type in question which is simple to manufacture.

A further object of the invention is to provide a sheet-metal ring mount of the type discussed herein which can be readily and reliably sealed.

In pursuance of these objects, and still others which will become apparent hereafter one aspect of the invention resides in a sheet-metal ring mount for anti-friction bearings which, briefly stated, comprises an inner ring and an outer ring each composed of two sheet metal annuli, one of the annuli of each ring having a first annular flange portion and radially thereof a first annular race portion of V-shaped configuration and the other of the annuli having a second annular flange portion overlapping the first annular flange portion and a second annular race portion angled with reference to the second annular flange portion and extending along and past one arm of the V of the first annular race portion so as to surround with another arm of the V two sides of an annular race the other two sides of which are surrounded by the similarly configurated other ring. A plurality of anti-friction rollers are received in the thus created track and successive ones of the rollers are turnable about axis of rotation which extend normal to one another, i.e. these rollers constitute the aforementioned cross-roller system.

According to a further embodiment of the invention the bearing is reinforced to a certain extent by providing the rings with annular reinforcing portions which may be provided, if desired, with lip seals.

The invention will hereafter be described with reference to an exemplary embodiment as illustrated in the drawing. However, it should be understood that this is by way of explanation only and not to be considered limiting in any sense.

BRIEF DESCRIPTION OF THE DRAWING

The single FIGURE is a fragmentary cross-section through one-half of a sheet-metal ring mount according to the present invention.

DESCRIPTION OF THE PREFERRED EMBODIMENTS

As shown in the FIGURE the illustrated sheet-metal ring mount has an inner ring 1, an outer ring 2 and a plurality of rollers 3 which are arranged in the race track formed by the inner and outer rings 1, 2 in an annulus. Although the entire ring mount is not shown it will be understood that it is, of course, of annular configuration and that similarly the race track formed by it is also of annular configuration. Successive rollers 3 are so arranged that their axis extend normal to one another, i.e. as indicated in the drawing the axis of rotation of the roller 3 which is shown is identified with reference numeral 4 and is inclined at a 90° angle relative to the axis of rotation 5 of the roller 3 which is behind it (and which is not visible). The successive rollers may be spaced from one another by appropriate spacers (not shown but known per se in the art).

The inner and outer rings 1, 2 is composed of two similar annuli of sheet metal. Each of these annuli of each ring includes one annulus having a mounting flange 10 or 11, respectively, and a radially adjacent portion of V-shaped cross-section which is identified with reference numeral 6 in the case of one ring (ring 1) and with reference numeral 7 in the case of the ring 2.

The second annulus 8, respectively 9, of each set also has a flange portion 10 and 11 which overlaps the flange portion of the first annulus, but instead of the V-shaped portion its has an angled-off portion 8, 9, respectively, which overlies one arm of the V-shaped portion of its associated other annulus and projects beyond this arm. The annuli 6, 8 forming the inner ring 1 and the annuli 7, 9 forming the outer ring 2 may be connected with one another in any desired manner, for example by means of screws, bolts, welding, adhesives or the like. The flanges 10, 11 are provided with bores 12, 13 for connection to the support structure, for example a vehicle. Parts of the V-shaped portions and parts of the angled-off portions together bound four sides of a race 14 and it is these portions which are convexly configurated in the direction towards the interior of the race in which a series of the aforementioned rollers 3 is located. The V-shaped portions are provided at their sides remote from the respective mounting flange 10, 11 with annular reinforcing portions 15, 16 which are located in the same plane as the mounting flange. However, these can be omitted if they are not necessary or desired. If the reinforcing portions 15, 16 are present, then they can in a simple manner be provided with a push-on lip seal 17, 18, respectively, which serve to seal the bearing. The sheet-metal ring mount according to the present invention permits a very efficaceous transmission of radial, axial and lifting forces via the cross-roller system constituted by the rollers 3. It can turn readily and freely without developing resistance peaks to such turning, even when it is mounted on supports (such a light-weight vehicles) which themselves are subject to twisting and deformation. It is clear, of course, that a sheet metal ring mount according to the invention can transmit only relatively small forces by comparison to the conventional solid and massive ring mount constructions, but for the particular type of application intended—i.e. especially for the mounting of light-weight weapons—even relatively high impact forces, such as recoil from explosions, can be withstood. The ring mount according to the present invention can be manufactured much more economically then those known from the prior art, is considerably lighter weight than the known ones and provides for a simple sealing of the roller system against the escape of lubricant and the entry of dirt and similar contaminants.

Beyond this, the ring mount according to the present invention offers still further advantages over the prior art. By constructing the annuli and making the two sets of annuli identical both for the inner and the outer bearing ring, a uniform stiffness and uniform behavior of the bearing is obtained despite the action of the most diverse kinds of forces and moments onto the bearing. Edge-rolling of the rollers on the track with the resultant premature wear of the track is eliminated by making the portions of the annuli which bound the track 14 of the aforementioned convex configuration. It has been quite surprisingly found that the V-shaped configuration of the annuli in the region of the track 14 enables the bearing to withstand and transmit relatively high impact forces without damage. Due to the similarity in the construction of the inner and outer ring the V-shaped area of each ring tends to uniformly open in the apex region of the track 14, in each of the inner and outer rings 1, 2 under the impact of impact forces and this opening can continue maximum up to the end of the elastic range of deformation. As a result of this the inner ring and the outer ring tend to move closer together in the apex region so that more rollers become able to transmit the forces than this would be the case in a bearing having a rigid inner and outer ring so that the rollers adjacent the apex region are capable of transmitting greater forces than was previously possible.

The invention has hereinbefore been described with reference to an exemplary embodiment which is, however, provided merely for purposes of explanation. The actual invention and the protection sought for it is defined in the appended claims.

What is claimed is:

1. Sheet-metal ring mount for anti-friction bearings, comprising an inner ring and an outer ring each composed of two sheet metal annuli, one of said annuli of each ring having a first annular flange portion and radially thereof a first annular race portion of V-shaped configuration and the other of said annuli having a second annular flange portion overlapping said first annular flange portion and a second annular angled-off portion with reference to said second annular flange portion and extending along and past one arm of the V of the first annular race portion so as to surround with another arm of the V two sides of an annular race the other two sides of which are surrounded by the similarly configurated other ring; and a plurality of anti-friction rollers received in said track, successive ones of said rollers being turnable about axes of rotation which extend normal to one another.

2. Sheet-metal ring mount as defined in claim 1, wherein parts of said annuli which together surround and are located at mutually opposite sides of the race, are convex in direction towards one another.

3. Sheet-metal ring mount as defined in claim 1, each of said first annular race portion having one side merging into said first annular flange portion and another side radially spaced from said one side; and further comprising an annular reinforcing portion at each of said other sides.

4. Sheet-metal ring mount as defined in claim 3; and further comprising a lip seal provided on each of said annular reinforcement portions.

* * * * *